United States Patent
Kajino et al.

(10) Patent No.: US 6,914,504 B2
(45) Date of Patent: Jul. 5, 2005

(54) ELECTROMAGNETIC SWITCH FOR A STARTER

(75) Inventors: Sadayoshi Kajino, Nagoya (JP); Youichi Hasegawa, Kasugai (JP); Syuichi Aoki, Oura-gun (JP); Hiroyasu Omiyama, Sawa-gun (JP)

(73) Assignees: Denso Corporation, Kariya (JP); Sawafuji Electric Co., Ltd., Tokyo (JP)

( * ) Notice: Subject to any disclaimer, the term of this patent is extended or adjusted under 35 U.S.C. 154(b) by 11 days.

(21) Appl. No.: 10/632,826

(22) Filed: Aug. 4, 2003

(65) Prior Publication Data

US 2004/0032309 A1 Feb. 19, 2004

(30) Foreign Application Priority Data

Aug. 19, 2002 (JP) ............................. 2002-238067

(51) Int. Cl.[7] .................................................. H01H 67/02
(52) U.S. Cl. .................................. 335/126; 335/131
(58) Field of Search .......................... 335/126, 131, 335/202

(56) References Cited

U.S. PATENT DOCUMENTS

| 4,987,396 A | * | 1/1991 | Bogner ....................... 335/126 |
| 6,380,833 B1 | * | 4/2002 | Nguyen et al. ............. 335/301 |
| 2002/0145494 A1 | * | 10/2002 | Andoh et al. ............... 335/126 |

FOREIGN PATENT DOCUMENTS

| JP | U 2-87967 | 7/1990 |
| JP | Y2 5-28380 | 7/1993 |
| JP | A 9-177645 | 7/1997 |
| JP | B2 2973577 | 9/1999 |
| JP | B2 2988001 | 10/1999 |

* cited by examiner

Primary Examiner—Lincoln Donovan
(74) Attorney, Agent, or Firm—Oliff & Berridge, PLC

(57) ABSTRACT

An electromagnetic switch has at least one pair of projection and groove engageable with each other and extending in an axial direction on an outer cylindrical surface of a solenoid casing and on an inner cylindrical surface of a switch casing. Engagement of the projection and the groove guides the solenoid casing shifting in the axial direction when inserted inside the switch casing.

8 Claims, 5 Drawing Sheets

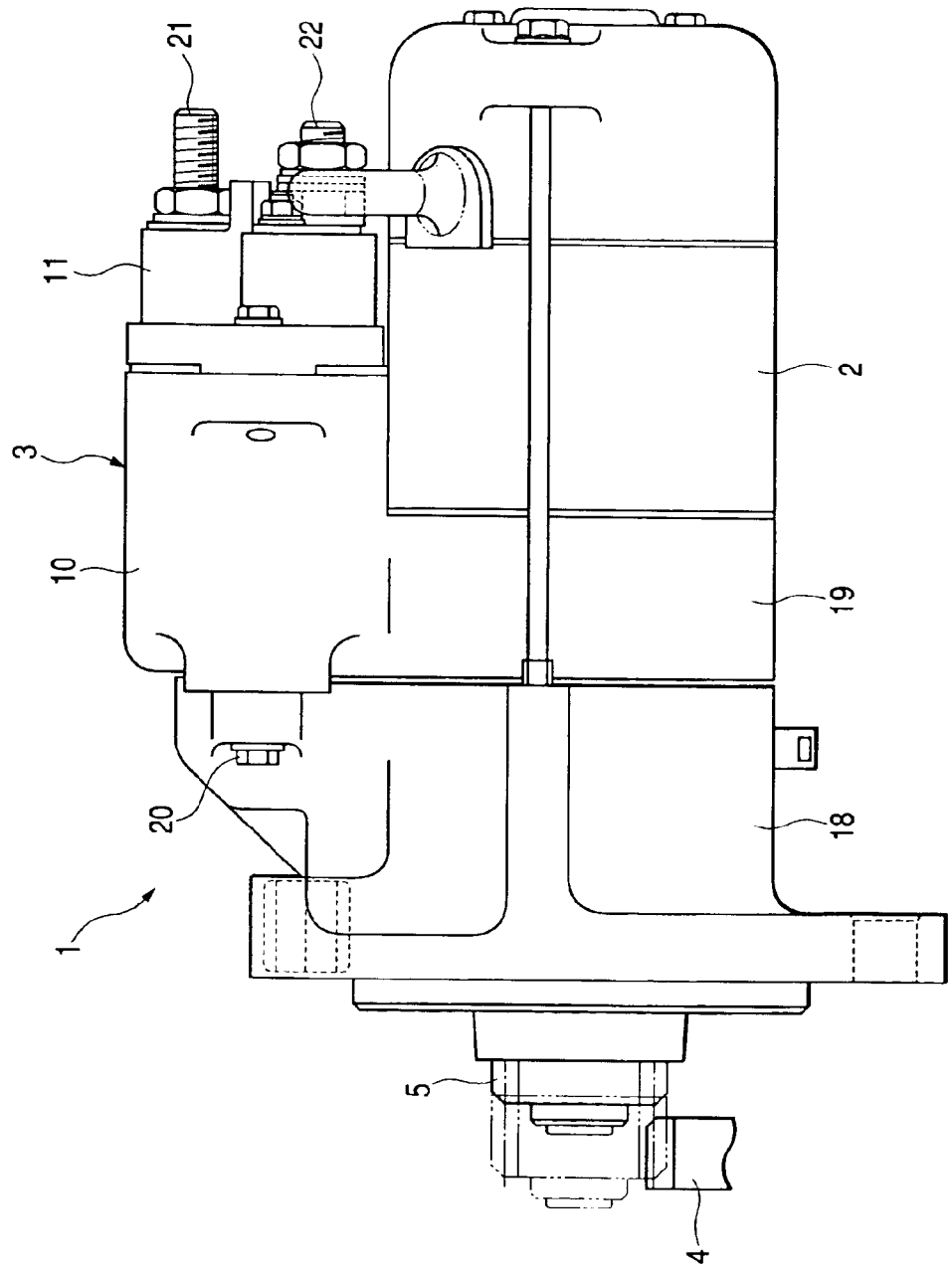

KNURL COUPLING

ELECTROMAGNETIC SWITCH FOR A STARTER

BACKGROUND OF THE INVENTION

This invention relates to an electromagnetic switch for a starter equipped with a switch casing for accommodating a solenoid casing which forms part of a magnetic circuit.

Japanese Patent No. 2973577 discloses a conventional magnet switch for a starter which includes a coil housing (i.e., a solenoid casing) coupled around an outer cylindrical surface of a coil and a starter casing (i.e., a switch casing) having an inside space for accommodating the coil housing. This magnet switch has a plurality of protrusions provided on an outer cylindrical surface of the coil housing or on an inner cylindrical surface of the starter casing. The coil housing is press-fitted into the starter casing, with the protrusions intervening between the coil housing and the starter casing.

However, according to the arrangement of the above-described conventional magnet switch, the circumferential position of the coil housing is arbitrarily changed with respect to the starter casing. The position for taking lead lines out of the coil housing is thus variable relative to the starter casing. It significantly takes a long time to accomplish the work for connecting the lead lines of the coil.

Furthermore, according to the arrangement of the above-described conventional magnet switch, a relatively large clearance remains between the inner cylindrical surface of the starter casing and the outer cylindrical surface of the coil housing. The radial size of the clearance formed between the starter casing and the coil housing is equivalent to the height of the projections. This clearance brings a disadvantage to the above-described conventional magnetic switch in that an available radial space for the coil housing is inevitably reduced due to this clearance in the case the allowable outer diameter of the starter casing is limited to a predetermined value. As a result, the radial size of the coil accommodated in the coil housing is restricted. The coil cannot sufficiently produce a magnetic attraction force.

SUMMARY OF THE INVENTION

In view of the above-described problems, the present invention has an object to provide an electromagnetic switch for a starter which is capable of easily and surely bringing the solenoid casing into a predetermined positional relationship with respect to the switch casing and also capable of assuring an enlarged radial space for the solenoid casing.

In order to accomplish the above and other related objects, the present invention provides an electromagnetic switch for a starter including a solenoid casing configured into a cylindrical body having a bottom formed at one axial end. A circular opening is provided on the bottom. A coil generating a magnetic attraction force is accommodated inside the solenoid casing. A plunger, shifting in the axial direction in response to the magnetic attraction force produced by the coil, is disposed slidably inside the coil via a cylindrical sleeve. A switch casing surrounds an outer surface of the solenoid casing. Furthermore, the electromagnetic switch of the present invention has at least one pair of projection and groove engageable with each other. One of the projection and groove is formed on an outer cylindrical surface of the solenoid casing, while the other of the projection and groove is formed on an inner cylindrical surface of the switch casing. Engagement of the projection and the groove guides the solenoid casing shifting in an axial direction when the solenoid casing is inserted inside the switch casing.

According to this arrangement, the positional relationship between the switch casing and the solenoid casing does not change in the circumferential direction. The position for taking the lead lines of the coil out of the solenoid casing is unchanged relative to the switch casing Furthermore, the clearance formed between the inner cylindrical surface of the switch casing and the outer cylindrical surface of the solenoid casing is small.

According to a preferred embodiment, the coil has lead lines connected to connecting terminals of a switch cover, and the switch cover is connected to the switch casing via a seal member.

Identifying the fixing position of the switch cover relative to the switch casing is feasible. Accurately positioning the solenoid casing in the circumferential direction with respect to the switch casing is feasible. With this arrangement, it becomes possible to take the lead lines of the coil out of the solenoid casing efficiently so as to correspond to the connecting terminals of the switch cover.

According to the preferred embodiment, a ground plate is disposed at the other axial end of the solenoid casing. The ground plate forms a magnetic circuit together with the solenoid casing. The coil is interposed between the bottom of the solenoid casing and the ground plate. And, the ground plate is fixed by deforming an opened end of the solenoid casing.

The coil can be placed to a predetermined position inside the solenoid casing. Engagement of the projection and the groove surely brings the switch casing and the solenoid casing into a predetermined positional relationship. The solenoid, as a whole, can be integrated and easily installed inside the switch casing. The installation processes become simple.

According to the preferred embodiment, the solenoid casing has a cylindrical portion protruding outward in the axial direction from the periphery of the circular opening of the bottom, and the sleeve is inserted inside the cylindrical portion of the solenoid casing.

The cylindrical portion of the solenoid casing can surely hold the sleeve. The shifting movement of the plunger sliding inside the sleeve is stable. Furthermore, the cylindrical portion of the solenoid casing can serve as part of the magnetic circuit. Firmly holding the sleeve by the cylindrical portion of the solenoid casing effectively prevents the wear of a sleeve receiving portion.

According to the preferred embodiment, the switch casing is integrally formed with a center housing interposing between a starter housing and a motor.

No screws or bolts are necessary to fix the solenoid casing to the center housing. Thus, it becomes possible to bring an excellent vibration-proof structure for the electromagnetic switch. Furthermore, no water enters inside the starter because no clearance is provided between the solenoid casing and the center housing.

Furthermore, according to the preferred embodiment, a plurality pairs of the projection and the groove are disposed at a plurality of circumferential positions spaced at equal angular intervals in the circumferential direction.

The switch cover is fixed to the switch casing by means of fixing members disposed at equal angular intervals in the circumferential direction. The total number of the fixing members is identical with that of the plurality pairs of the projection and the groove.

The switch cover has a pair of motor terminals for providing an electric path supplying electric power to a motor when connected to each other. The motor terminals are disposed oppositely about an axial center of the switch cover. The switch cover has two coil terminals connected to the coil via lead lines. The coil terminals are disposed oppositely about the axial center of the switch cover.

BRIEF DESCRIPTION OF THE DRAWINGS

The above and other objects, features and advantages of the present invention will become more apparent from the following detailed description which is to be read in conjunction with the accompanying drawings, in which:

FIG. 4 is a vertical side view showing an overall arrangement of a starter in accordance with the preferred embodiment of the present invention;

DESCRIPTION OF THE PREFERRED EMBODIMENTS

Preferred embodiments of the present invention will be explained hereinafter with reference to attached drawings.

Figure 1:
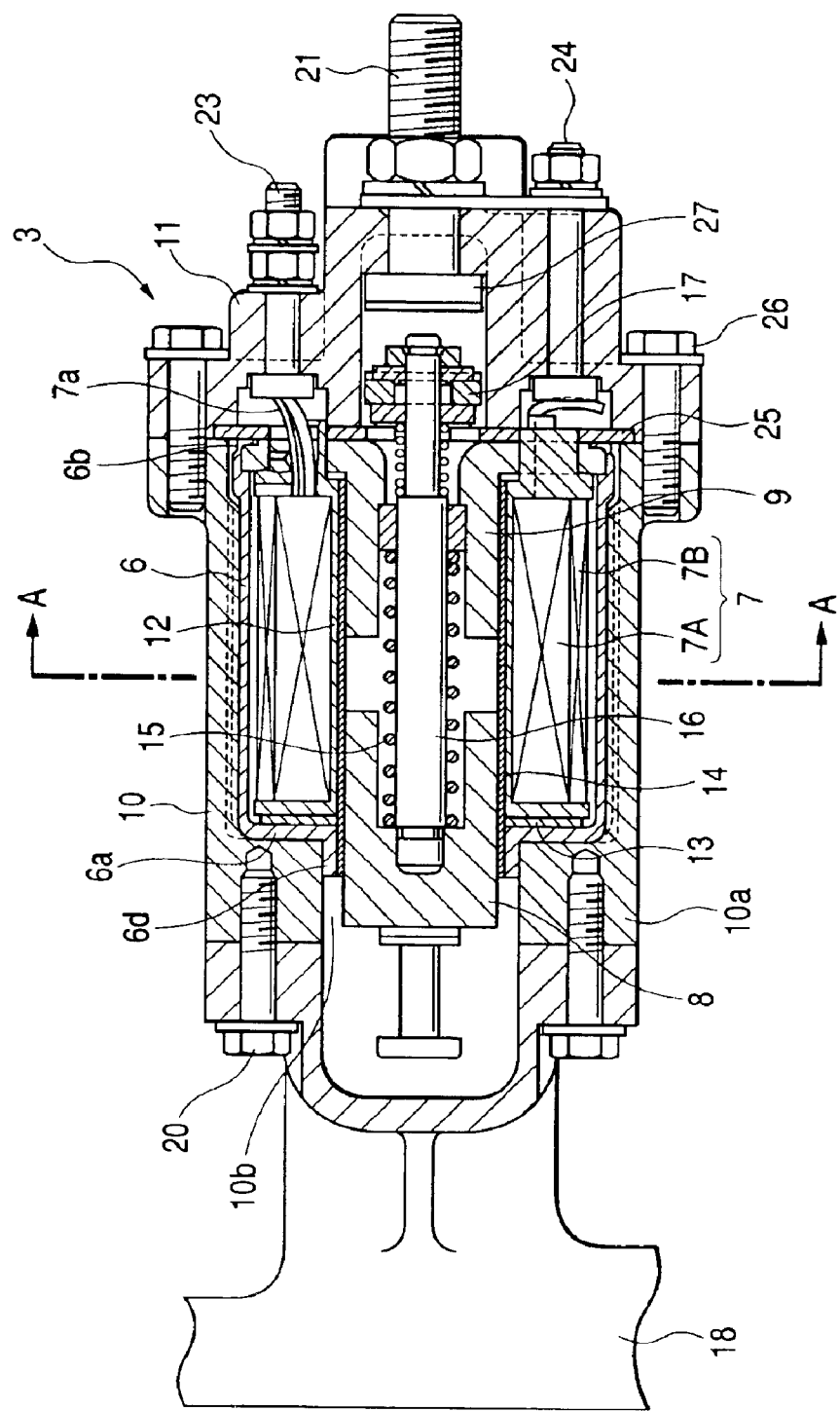
FIG. 1 is a cross-sectional view showing an electromagnetic switch in accordance with a preferred embodiment of the present invention, taken along a horizontal plane.
Figure 3:
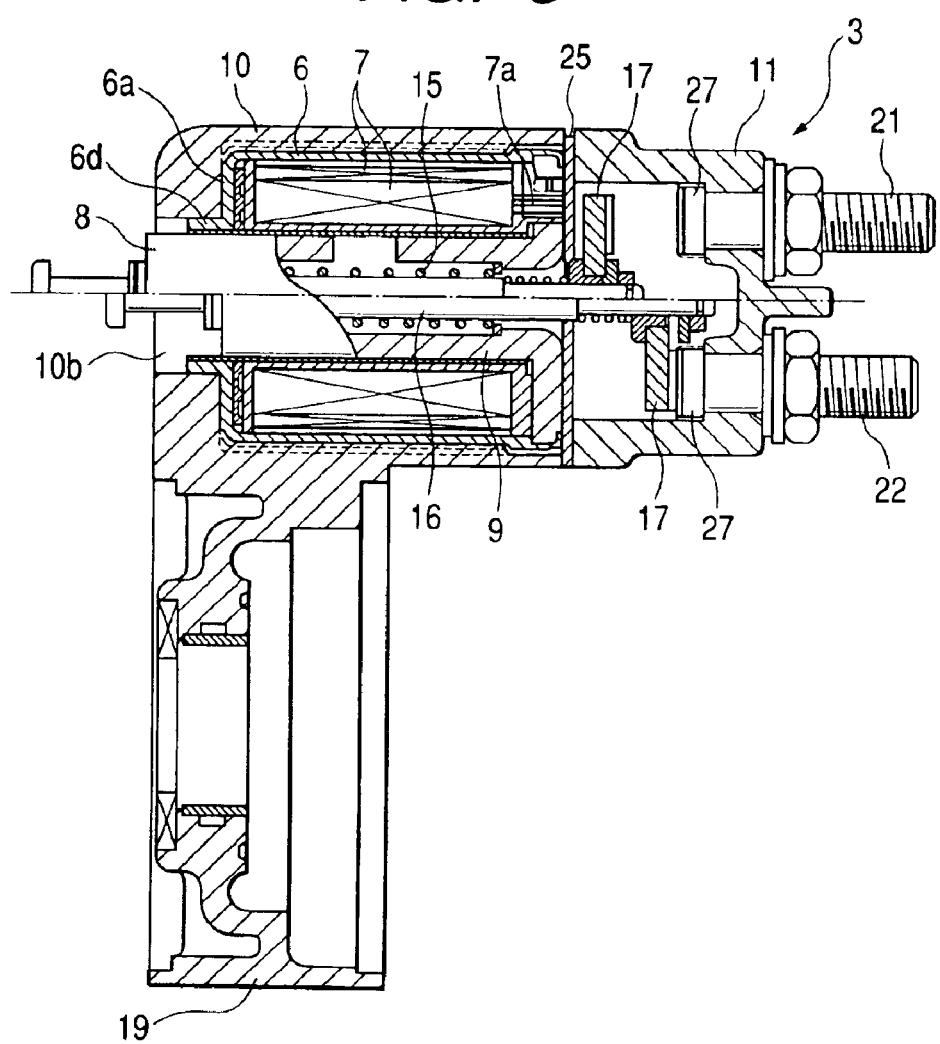
FIG. 3 is a cross-sectional view showing the electromagnetic switch in accordance with the preferred embodiment of the present invention, taken along a vertical plane.

FIG. 1 is a cross-sectional view showing an electromagnetic switch 3 taken along a horizontal plane. FIG. 3 is a cross-sectional view showing the electromagnetic switch 3 taken along a vertical plane.

A starter 1 according to this embodiment, as shown in FIG. 4, includes a motor 2 which produces a rotational force required to start an engine. An electromagnetic switch 3 controls electric power supply to the motor 2. A pinion gear 5 selectively engages with a ring gear 4 of the engine to transmit the rotational force of the motor 2 to the ring gear 4.

The motor 2 is a well-known DC (i.e., direct-current) motor. When an ignition key (not shown) is turned on, the electromagnetic switch 3 closes a later-described motor contact incorporated therein. When the motor contact is closed, electric power is supplied from a vehicle battery (not shown) to an armature (not shown). The armature starts rotating in response to electric power supply. The electromagnetic switch 3, as shown in FIGS. 1 and 3, includes a solenoid casing 6, a coil 7, a plunger 8, a ground plate 9, a switch casing 10, and a switch cover 11.

The solenoid casing 6, configured into a cylindrical body, has a bottom 6a at one axial end (i.e., the left side in FIG. 1) of the cylindrical body. The bottom 6a has a circular opening provided at its center. The solenoid casing 6 has a thinned portion 6b with an opening at the other axial end of the cylindrical body.

Figure 2:
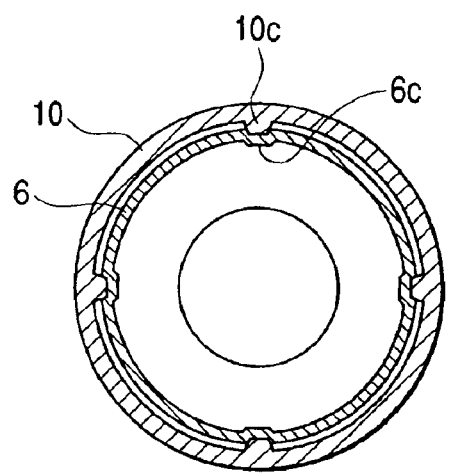
FIG. 2 is a cross-sectional view showing the electromagnetic switch in accordance with the preferred embodiment of the present invention, taken along a line A—A of FIG. 1.

The solenoid casing 6 has an outer cylindrical surface on which a predetermined number of engaging grooves 6c are formed at predetermined angular intervals. For example, as shown in FIG. 2, a total of four engaging grooves 6c are disposed in the circumferential direction at the equal angular intervals of 90°. Each engaging groove 6c, being recessed toward the radially inner direction, extends in the longitudinal direction (i.e., in the axial direction) from the above-described one axial end to the vicinity of the thinned portion 6b. In other words, no engaging groove 6c is formed in the region of the thinned portion 6b of the solenoid casing 6. Furthermore, the solenoid casing 6 has a cylindrical portion 6d integrally formed with the bottom 6a. The cylindrical portion 6d protrudes outward in the axial direction (i.e., leftward in FIG. 1) from the entire periphery of the circular opening of the bottom 6a.

The coil 7 consists of an attracting coil 7A and a holding coil 7B. These coils 7A and 7B are wound around a bobbin 12 so as to constitute a two-layered construction, and are accommodated inside the solenoid casing 6. The coil 7 is tightly held between the bottom 6a of solenoid casing 6 and the ground plate 9 via a packing 13.

The plunger 8 is slidable along an inner cylindrical surface of the bobbin 12 via a sleeve 14. A return spring 15 resiliently urges the plunger 8 to the left in FIG. 1.

A rod 16 has one end fixed to the plunger 8 and the other end holding a movable contact for opening or closing the above-described motor contact.

The ground plate 9 and the solenoid casing 6 cooperatively form a magnetic circuit. The ground plate 9 has a central cylindrical portion which is inserted inside the sleeve 14 and is opposed to the rear end of the plunger 8. The rear end of the ground plate 9, extending as an end plate in the radial direction, is positioned at the other opening of the solenoid casing 6 and is fixed by deforming (by caulking) the thinned portion 6b of the solenoid casing 6.

The ground plate 9 has holes for taking the lead lines 7a of the coil 7 out of the ground plate 9.

The switch casing 10 has a function of accommodating and holding the solenoid casing 6. As shown in FIG. 4, the switch casing 10 is integrally formed with a center housing 19 interposing between a starter housing 18 and the motor 2. The switch casing 10 is fixed to the starter housing 18 by means of bolts 20.

The switch casing 10 is configured into a cylindrical body with a bottom wall 10a at one axial end. A round hole 10b is opened at the center of the bottom wall 10a. The cylindrical portion 6d of solenoid casing 6 engages with the round hole 10b. The switch casing 10 has an inner cylindrical surface on which a predetermined number of engaging projections 10c are formed at predetermined angular intervals. The number of the engaging projections 10c is identical with that of the engaging grooves 6c of the solenoid casing 6. Namely, as shown in FIG. 2, a total of four engaging projections 10c are disposed in the circumferential direction at the equal angular intervals of 90°. Each engaging projection 10c, protruding toward the radially inner direction, extends in the longitudinal direction (i.e., in the axial direction). The engaging projections 10c of the switch casing 10 respectively engage with the engaging grooves 6c of the solenoid casing 6 as shown in FIG. 2. Thus, each combination of the engaging projection 10c and the engaging groove 6c serves as a pair of projection and groove engageable with each other.

The switch cover 11 has a pair of external terminals 21 and 22 (refer to FIG. 3) and two coil terminals 23 and 24 (refer to FIG. 1). The switch cover 11 is fixed to the opened end surface of the switch casing 10 via a seal member 25 by means of bolts 26. The bolts 26, serving as fixing members, are disposed at equal angular intervals in the circumferential direction. The total number of the bolts 26 is identical with that of the paired projections 10c and the grooves 6c. The circumferential position of each bolt 26 agrees with the circumferential position of the paired projection 10c and the groove 6c.

One external terminal 21, serving as a battery terminal, is connected to the vehicle battery. The other external terminal 22, serving as motor terminal, is connected to the motor 2. These external terminals 21 and 22 are fixed to the switch cover 11 by molding. As shown in FIG. 3, each of the external terminals 21 and 22 is equipped with a stationary contact 27 (i.e., the above-described motor contact) provided inside the switch cover 11.

Two coil terminals 23 and 24 are fixed to the switch cover 11 by molding, like the external terminals 21 and 22. The lead lines 7a of the coil 7, disposed inside the switch cover 11, are electrically connected to the inner ends of the coil terminals 23 and 24.

The external terminals 22 are disposed oppositely about the axial center of the switch cover 11. Similarly, the coil terminals 23 and 24 are disposed oppositely about the axial center of the switch cover 11. As a result, four terminals 21, 22, 23, and 24 are symmetrically disposed about the axial center of the switch cover 11 at equal angular intervals (i.e., 90°) in the circumferential direction.

The above-described electromagnetic switch 3 operates in the following manner.

When electric power is supplied to the coil 7 in response to turning-on operation of the ignition key, the coil 7 magnetically attracts the plunger 8 toward the ground plate 9 from a home position shown in FIG. 1 (i.e., the plunger 8 moves to the right in FIG. 1) against the resilient force of the return spring 15. The rod 16 shifts together with the plunger 8 in the axial direction. Thus, the movable contact 17 held at the rear end of the rod 16 is brought into contact with a pair of stationary contacts 27, so as to provide an electrical path between the separated stationary contacts 27 for supplying electric power to the motor 2 (refer to the lower half divided by an alternate long and short dash line shown in FIG. 3). In other words, the electric power supply circuit of the motor 2 is closed and accordingly the armature generates a rotational force.

The electromagnetic switch shown in FIG. 3 is partly depicted separately into the upper half (showing a non-operated condition) and the lower half (showing an operated condition) with respect to the axis of the plunger 8.

After the engine starts rotating, electric power supply to the coil 7 will be stopped when the ignition key is turned off. In response to the turning-off operation of the ignition key, the return spring 15 resiliently depresses the plunger 8 and returns it to the home position. Thus, the movable contact 17 is disengaged from the stationary contacts 27. The electric power supply circuit of the motor 2 is opened.

According to the electromagnetic switch 3 of the above-described embodiment, when the solenoid casing 6 is inserted into the switch casing 10, the engaging projections 10c formed on the inner cylindrical surface of the switch casing 10 are engaged with the engaging grooves 6c formed on the outer cylindrical surface of the solenoid casing 6. Thus, the solenoid casing 6 is firmly supported and accurately positioned by the switch casing 10.

The engaging projections 10c of the switch casing 10 and the engaging grooves 6c of the solenoid casing 6, mating with each other, are disposed at a plurality of (e.g., four) circumferential positions spaced at equal angular intervals (e.g., 90°) in the circumferential direction.

The switch cover 11 is directly fixed to the switch casing 10 by means of the bolts 26. The circumferential position of the solenoid casing 6 can be determined so as to correspond to the positions of the coil terminals 23 and 24 provided on the switch cover 11. In other words, by adjusting the circumferential position of the solenoid casing 6 with respect to the switch cover 11, the lead holes provided on the ground plate 9 can be surely disposed in the vicinity of the coil terminals 23 and 24. It is unnecessary to elongate the lead lines 7a of the coil 7 from the lead holes of the ground plate 9 to connect the lead lines 7a of the coil 7 to the coil terminals 23 ad 24. This is advantageous in preventing breaking of the lead lines 7a of the coil 7.

Furthermore, the above-described embodiment makes it possible to reduce the clearance between the inner cylindrical surface of the switch casing 10 and the outer cylindrical surface of the solenoid casing 6. The outer diameter of the solenoid casing 6 can be enlarged effectively. The radial size of the coil 7 can be increased, too. Hence, the coil 7 can produce a large magnetic attraction force. Furthermore, the engaging grooves 6c formed on the solenoid casing 6 extend in the limited longitudinal region from one axial end to the opposite side closer to the thinned portion 6b. No engaging groove 6c is formed in the region of the thinned portion 6b. Thus, the thinned portion 6b is easily deformable for surely fixing the ground plate 9.

The solenoid casing 6 has the cylindrical portion 6d extending in the axial direction from the entire periphery of the circular hole opened on the bottom 6a of the solenoid casing 6. The sleeve 14 is inserted inside the cylindrical portion 6d. The plunger 8 is surely supported via the sleeve 14 by the cylindrical portion 6d. This assures stable operation of the plunger 8. The cylindrical portion 6d effectively serves as part of the magnetic circuit. The cylindrical portion 6d is inserted into the round hole 10b of the switch casing 10. Thus, the solenoid casing 6 is surely held by the switch casing 10.

According to the electromagnetic switch 3 of the above-described embodiment, the switch casing 10 is integrally formed with the center housing 19. It is needless to say that no screws or bolts are necessary to fix the solenoid casing 6 to the center housing 19. Thus, this embodiment brings an excellent vibration-proof structure for the electromagnetic switch. Furthermore, no water enters inside the starter 1 because no clearance is provided between the solenoid casing 6 and the center housing 19.

Figure 5A:
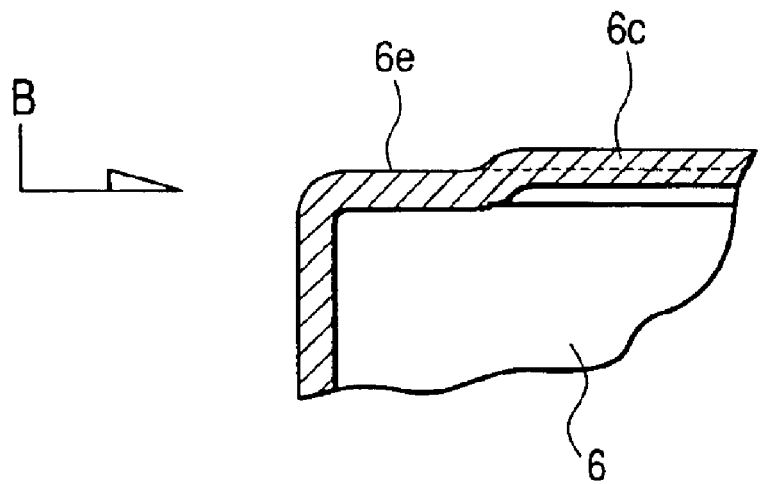
FIG. 5A is a cross-sectional view showing an insertion guide portion provided at one axial side of a solenoid casing in accordance with another preferred embodiment of the present invention.
Figure 5B:
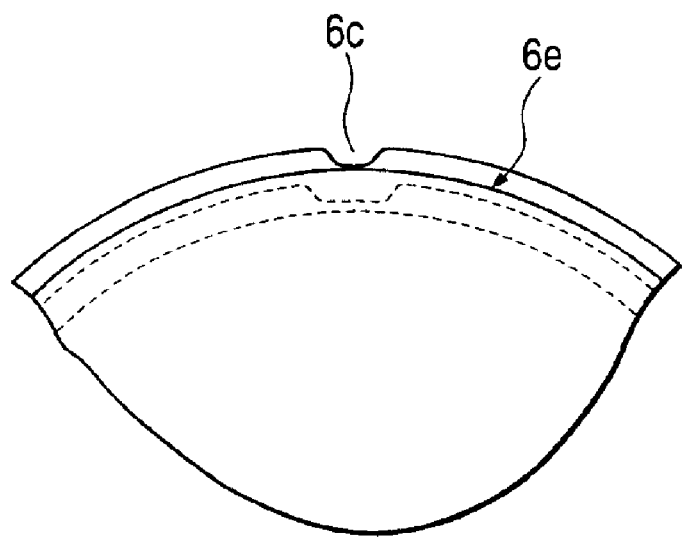
FIG. 5B is a side view showing the insertion guide portion seen from the direction of an arrow B shown in FIG. 5C.

FIGS. 5A and 5B show a modified structure of the solenoid casing 6 which has a cylindrical surface 6e formed at the axial end thereof. An outer diameter of the cylindrical surface 6e is identical with a diameter of a circle passing the deepest points of respective engaging grooves 6c. No engaging groove is formed in the region of the cylindrical surface 6e. The cylindrical surface 6e of the solenoid casing 6 serves as a guide used when the solenoid casing 6 is inserted into the switch casing 10.

Figure 6:
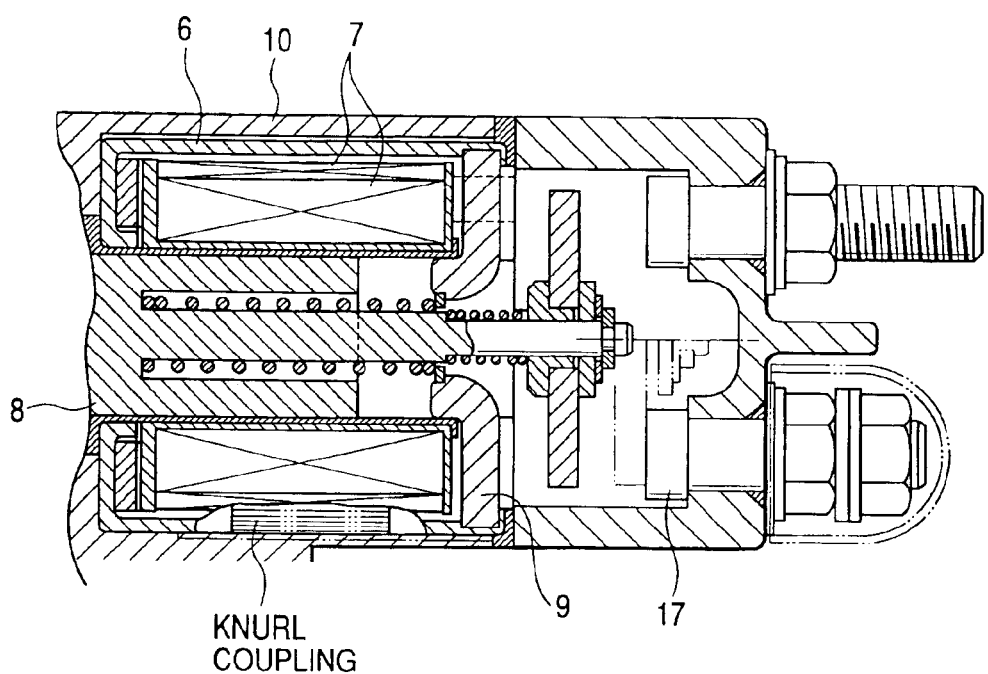
FIG. 6 is a cross-sectional view showing a knurl coupling applied for positioning the solenoid casing in accordance with another embodiment of the present invention.

Furthermore, the engagement between the engaging grooves 6c and the engaging projections 10c can be replaced by a knurl coupling a shown in FIG. 6.

Figure 7:
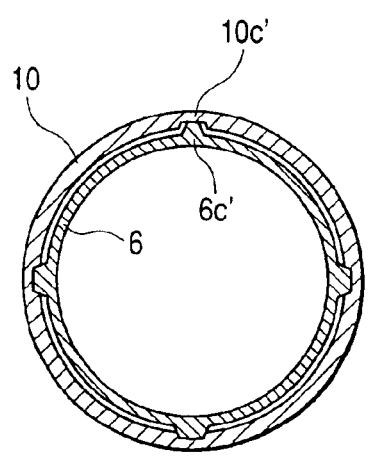
FIG. 7 is a cross-sectional view showing another embodiment of the electromagnetic switch, taken along a line A—A of FIG. 1.

Furthermore, FIG. 7 shows another embodiment of the present invention, according to which a predetermined number of (e.g., four) engaging projections 6c' are formed on the outer cylindrical surface of the solenoid casing 6 at predetermined angular intervals (e.g., 90°). The same number of engaging grooves 10c' are formed on the inner cylindrical surface of the switch casing 10 at the same angular intervals. Each engaging groove 10c', being recessed toward the radially outer direction, extends in the longitudinal direction (i.e., in the axial direction). The engaging grooves 10c' of the switch casing 10 respectively engage with the engaging projections 6c' of the solenoid casing 6 as shown in FIG. 7. Thus, each combination of the engaging groove 10c' and the engaging projection 6c' serves as a pair of projection and groove engageable with each other.

It is needless to say that the total number or the circumferential positions of respective engaging projections and grooves can be adequately changed.

What is claimed is:

1. An electromagnetic switch for a starter, comprising:
   a solenoid casing configured into a cylindrical body having a bottom formed at one axial end, with a circular opening provided on said bottom;
   a coil accommodated inside said solenoid casing;
   a plunger disposed slidably inside said coil via a cylindrical sleeve;
   a switch casing surrounding an outer surface of said solenoid casing;
   a switch cover having two external terminals and two coil terminals and being fixed to said switch casing, one of said external terminals of said switch cover being a battery terminal connected to a battery, the other one of said external terminals being a motor terminal connected to a motor, and said coil terminals of said switch cover being electrically connected to two lead lines of said coil, respectively; and
   at least one pair of a projection and a groove engageable with each other, one of said projection and said groove being formed on an outer cylindrical surface of said solenoid casing and the other of said projection and said groove being formed on an inner cylindrical surface of said switch casing, and engagement of said projection and said groove positioning said solenoid casing in a circumferential direction of said switch casing at a time of inserting said solenoid casing into the switch casing such that said lead lines of said coil accommodated inside said solenoid casing are disposed in a vicinity of said coil terminals of said switch cover fixed to said switch casing.

2. The electromagnetic switch for a starter in accordance with claim 1, wherein said switch cover is connected to said switch casing via a seal member.

3. The electromagnetic switch for a starter in accordance with claim 1, wherein
   a ground plate is disposed at the other axial end of said solenoid casing so as to form a magnetic circuit together with said solenoid casing,
   said coil is interposed between said bottom of said solenoid casing and said ground plate, and
   said ground plate is fixed by deforming an opened end of said solenoid casing.

4. The electromagnetic switch for a starter in accordance with claim 1, wherein said solenoid casing has a cylindrical portion protruding outward in the axial direction from the periphery of said circular opening of said bottom, and said sleeve is inserted inside said cylindrical portion of said solenoid casing.

5. The electromagnetic switch for a starter in accordance with claim 1, wherein said switch casing is integrally formed with a center housing interposing between a starter housing and a motor.

6. The electromagnetic switch for a starter in accordance with claim 1, wherein a plurality pairs of the projection and the groove are disposed at a plurality of circumferential positions spaced at equal angular intervals in the circumferential direction.

7. The electromagnetic switch for a starter in accordance with claim 6, wherein
   said switch cover is fixed to said switch casing by means of fixing members disposed at equal angular intervals in the circumferential direction, and
   the total number of said fixing members is identical with that of said plurality pairs of the projection and the groove.

8. The electromagnetic switch for a starter in accordance with claim 1, wherein
   said motor terminal and said battery terminal of said switch cover are disposed oppositely about an axial center of the switch cover for providing an electric path supplying electric power to a motor when connected to each other, and
   said coil terminals of said switch cover are disposed oppositely about the axial center of the switch cover.

* * * * *